United States Patent [19]

Clark

[11] Patent Number: 4,827,393

[45] Date of Patent: May 2, 1989

[54] ALTERNATOR AND REGULATOR FOR USE THEREWITH

[75] Inventor: Peter B. Clark, Warkworth, New Zealand

[73] Assignee: Clark Automotive Development Limited, Auckland, New Zealand

[21] Appl. No.: 107,585

[22] Filed: Oct. 13, 1987

[30] Foreign Application Priority Data

Oct. 16, 1986 [NZ] New Zealand .................. 217972

[51] Int. Cl.$^4$ .................................................. H02M 3/28
[52] U.S. Cl. ................................................ 363/79; 322/28
[58] Field of Search ............ 322/28 X, 46; 323/266; 363/124, 80

[56] References Cited

U.S. PATENT DOCUMENTS

| | | | |
|---|---|---|---|
| 3,742,330 | 6/1973 | Hodges et al. | 323/266 |
| 4,104,714 | 8/1978 | Smith et al. | 363/80 |
| 4,172,277 | 10/1979 | Pinson | 363/80 |
| 4,251,857 | 1/1981 | Shelly | 323/266 |
| 4,272,806 | 6/1981 | Metzger | 363/80 |
| 4,326,245 | 4/1982 | Saleh | 363/79 |
| 4,344,122 | 8/1982 | Jones | 363/23 |
| 4,527,226 | 7/1985 | Glennon | 363/79 |
| 4,672,518 | 6/1987 | Murdock | 363/80 |

Primary Examiner—Patrick R. Salce
Assistant Examiner—Jeffrey Sterrett
Attorney, Agent, or Firm—Young & Thompson

[57] ABSTRACT

A regulator is disclosed for regulating a DC power supply such as an automotive alternator or generator which has a wide speed range and is hence capable of producing an output voltage and power which varies between wide limits. The regulator comprises electronic circuitry which allows the voltage at the alternator to rise while limiting the current therethrough, typically by means of pulse-width modulation; a DC-DC converter connected to the load; and circuitry to control the output voltage of the DC-DC converter within close limits. A permanent magnet alternator provided with a regulator of the type described is also disclosed.

4 Claims, 8 Drawing Sheets

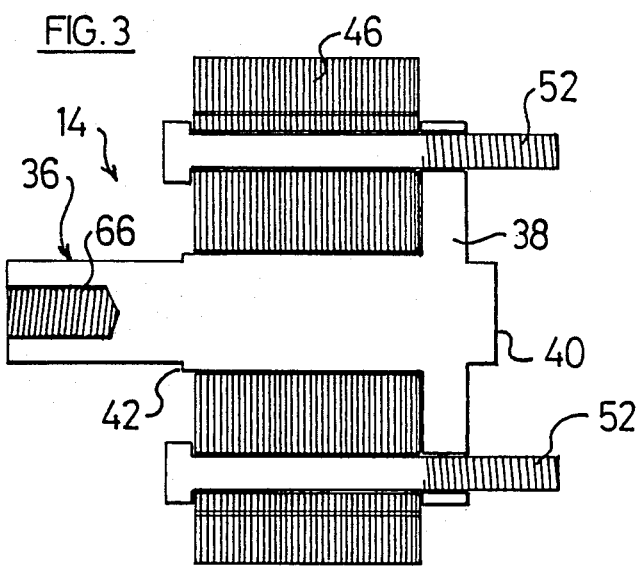
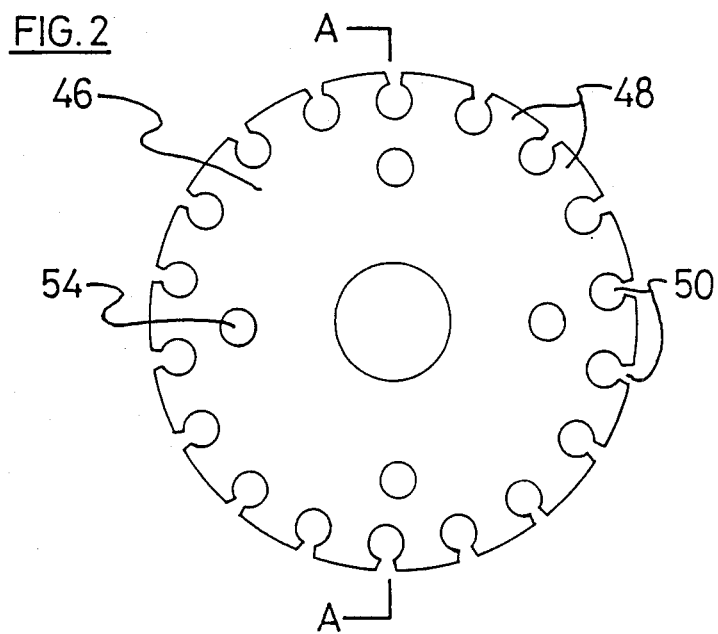

ALTERNATOR AND REGULATOR FOR USE THEREWITH

FIELD OF THE INVENTION

This invention relates to a regulator for use with permanent magnet alternators and with alternators having field wound rotors as well as with any suitable DC or rectified AC power supply driven by a variable speed source of mechanical power but not exclusively for use with the alternator.

BACKGROUND OF THE INVENTION

Alternators with permanent magnets have been known for many years. For various reasons they have not, however, been widely used in automotive installations. Such alternators would have significant advantages in automotive applications. They have a small number of moving parts and are therefore dependable. They can be very compact and also electrically efficient. This latter characteristic is important as modern motor vehicles are making ever increasing demands on their electrical supply; so much so that it is becoming increasingly common for motor vehicles to be fitted with, for example, 12 volt, 50 amp alternators which usually require a twin pulley, twin v-belt drive with concomitant robustness of construction, bearings etc as well as increased fuel consumption.

It is not clear why permanent magnet-type alternators are not widely used in the market place in automotive applications. One reason may be that no economically viable regulator has hitherto been produced which is capable of regulating the output voltage thereof over wide variations in speed and power demands. This would seem to be borne out by the fact that such alternators used in motor cycles have only crude regulators which comprise essentially simple inductances. This is very deleterious for the batteries to which they are connected.

OBJECT OF THE INVENTION

It is one object of the invention to provide voltage regulating means which meets this requirement. It is a further object of the invention to provide an alternator for use in conjunction with such voltage regulating means.

STATEMENT OF INVENTION

According to the invention there is provided apparatus for controlling the output of a variable voltage DC power supply including means to limit the current through the output of the supply while allowing the voltage to increase; DC-DC converter means having an input for connection to the output of the supply and an output for connection to a load; and means to voltage limit the output of the DC-DC converter means.

Further according to the invention there is provided, in combination, a power source comprising a generator or alternator having a DC output; means to limit the current through the output of the source while allowing the voltage to increase; DC-DC converter means having an input for connection to the output of the source and an output for connection to a load; and means to voltage limit the output of the DC-DC converter means.

In one form of the invention the power supply comprises a generator or an alternator provided with rectifier means.

Still further according to the invention there is provided a method of controlling the output of a variable voltage DC power supply including the steps of connecting the output to an input of a DC-DC converter means having an output connected to a load; limiting the current through the output of the supply while allowing the voltage to increase; and voltage limiting the output of the DC-DC converter means.

According to one aspect of the invention the current through the output is limited by pulse-width modulation means.

BRIEF DESCRIPTION OF DRAWINGS

The invention is further discussed with reference to the accompanying drawings which illustrate, by way of example only, an embodiment of the invention and in which:

FIG. 2 is an end view of a stator forming part of the alternator;

FIG. 3 is a sectional view on arrows A—A of FIG. 2; and also includes a central support member and security bolts.

DETAILED DESCRIPTION OF DRAWINGS

Figure 1:
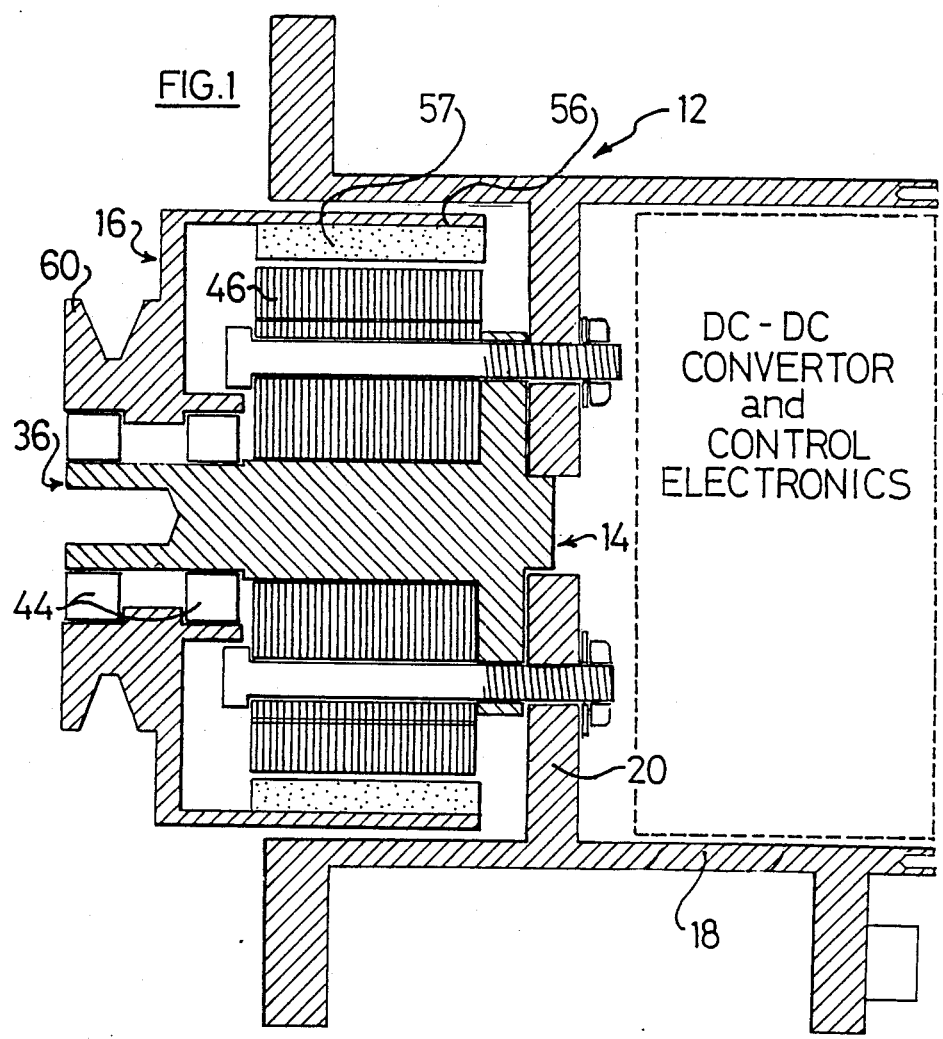
FIG. 1 is a somewhat schematic cross-sectional view of an alternator.
Figure 4:
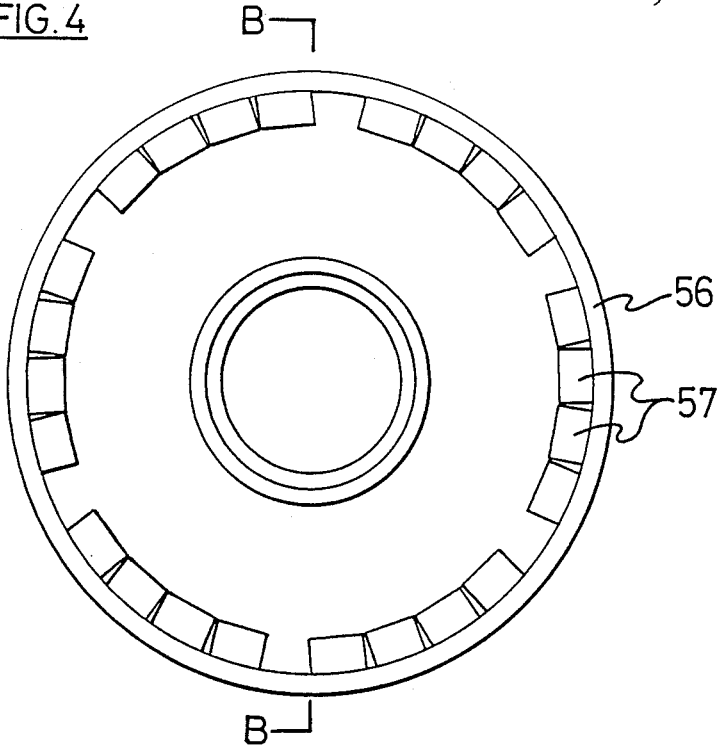
FIG. 4 is an end view of a rotor forming part of the alternator.
Figure 5:
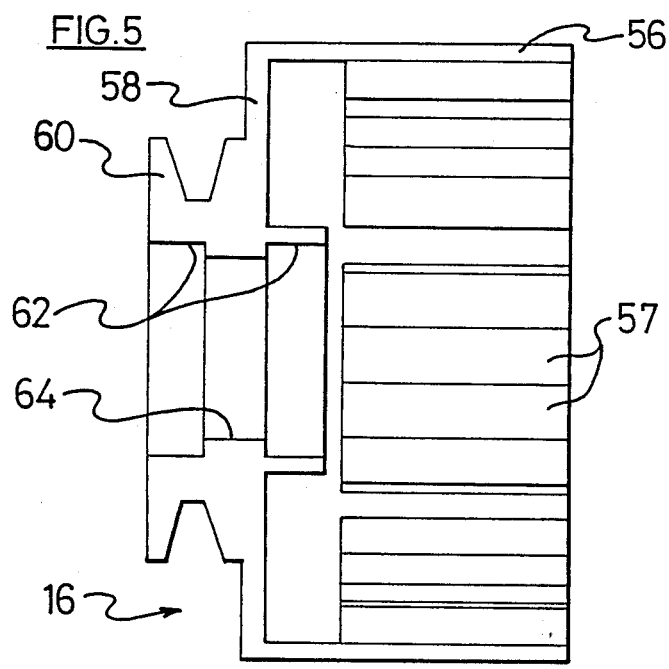
FIG. 5 is a sectional view on arrows B—B of FIG. 4.
Figure 6:
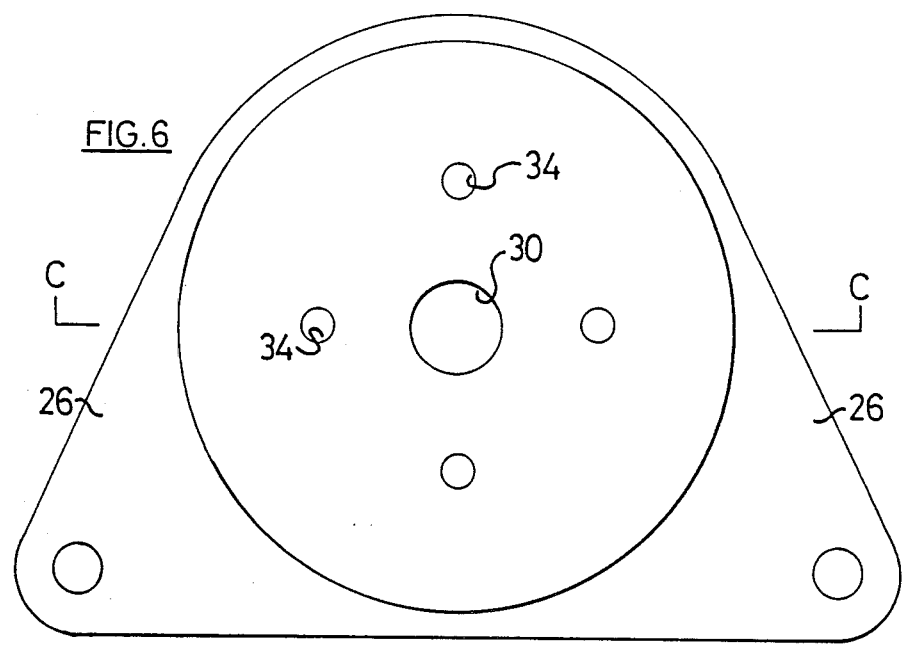
FIG. 6 is an end view of a casing forming a part of the alternator.
Figure 7:
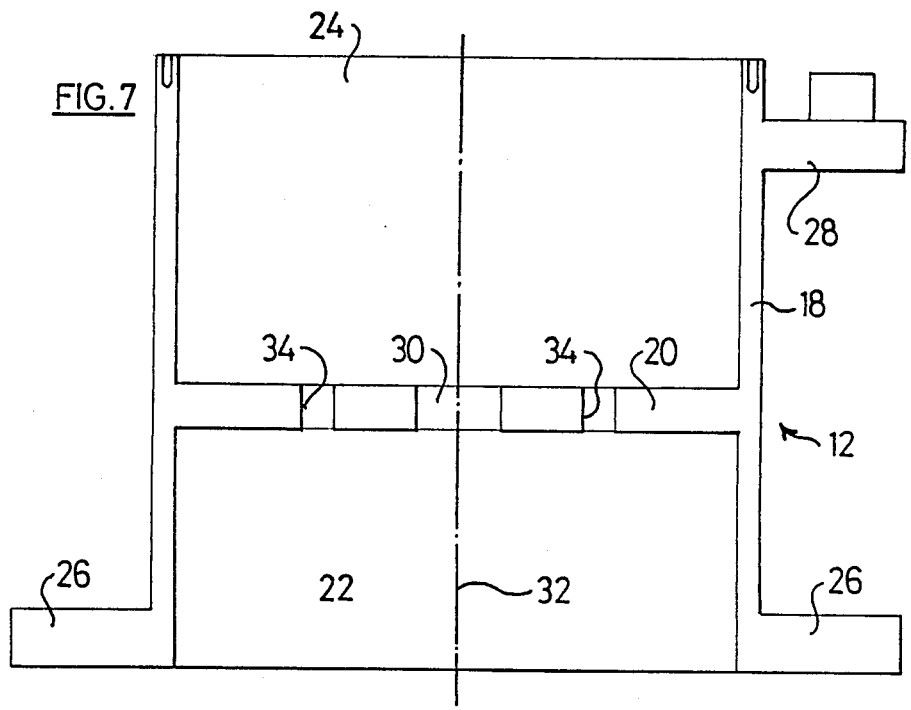
FIG. 7 is a section view on arrows C—C in FIG. 6.

Referring to the drawings, the alternator 10 comprises a casing 12, a stator 14, and a rotor 16.

The casing 12 comprises essentially a right-circular cylindrical wall 18 provided with a cross wall 20 intermediate its ends which divides the bore of the casing into two portions 22, and 24. The casing is also provided with outwardly projecting lugs two of which, 26, are located at one end of the casing and one, 28, being located near the opposite end of the casing and in alignment with one of the lugs 26. The lugs are used in a known manner for mounting the alternator on the engine of a motor vehicle.

The cross wall 20 is provided with a central hole 30 lying on the longitudinal axis 32 of the casing and four holes 34 spaced uniformly around the central hole 30.

The casing is advantageously an aluminium die-casting.

The stator 14 comprises a central support member 36 of circular cross section having a round flange 38 located near the end thereof, leaving a spigot portion 40 projecting from the face of the flange. At the opposite end a shoulder 42 is machined in the support member for the location of a pair of ball bearings 44, best seen in FIG. 1. Between the shoulder 42 and the flange 38 a series of lamination elements 46 is mounted.

The shape of each element 46 is best seen in FIG. 2. The element comprises, essentially, a disc the periphery of which is formed with a multiplicity of radially outwardly projecting finger-like portions 48 with spaces 50 therebetween. The elements 4C are held in place on the member 36 by means of bolts 52 which pass through holes 54 in the elements 46 and flange 38 and engage the holes 34 in the cross wall 20 of the casing. The bolts thus serve to hold the components of the stator together as well as holding the stator in fixed coaxial position in the casing.

The spigot 40 in the stator fits closely into the hole 30 in the cross wall of the casing, centralising the stator in the casing.

The projections 48 and spaces 50 of the elements 46 are in alignment when the stator is assembled and receive windings (not shown) in the conventional manner, the ends of the windings being led to terminals (not shown) in the portion 24 of the casing 12. The rotor 16 is a cup-shaped steel forging comprising a right circular cylindrical wall 56 provided with a cross wall 58 at one end with an integral coaxial pulley 60 for a v-belt. The cross wall 58 is bored out to provide a pair of seats 62 spaced apart by a shoulder 64 for the bearings 44. The outside diameter of the wall 56 is marginally smaller than that of the casing so that the rotor is a neat fit in the casing.

Twenty-four identical, permanent ceramic bar magnets 57 are mounted on the inside of the wall 56, uniformly spaced therearound in six blocks of four and disposed alternately with their North and South ends to the inner face of the rotor. The size of these magnets is such that the rotor can be inserted in the annular space in the casing between the stator and the wall 18, the magnets neatly clearing the outside of the rotor. The rotor is held in place on the member 36 of the stator by means of a bolt which is mounted in the threaded hole 66 in the end of the member 36 and which holds a retaining plate against the inner race of the outer bearing 44.

The permanent magnet alternator 10 in its present form uses magnets of dimensions 38 mm (L) ×9 mm (W) ×6 mm (D) In production versions a ring magnet of dimensions 96 mm (OD) ×84 mm (ID) ×38 mm (L) might be used.

Rotation of the rotor by means of a v-belt driven by the engine will thus induce an alternating voltage in the windings of the stator. In the present example this is a three phase winding with an open circuit voltage of 7 volts AC (RMS) per 1000 r.p.m. of the rotor for each phase. The alternator is thus capable of producing 12 volts DC after rectification at an alternator r.p.m. of 800 representing a slow idle engine speed of, say, 550 r.p.m.

Figure 8:
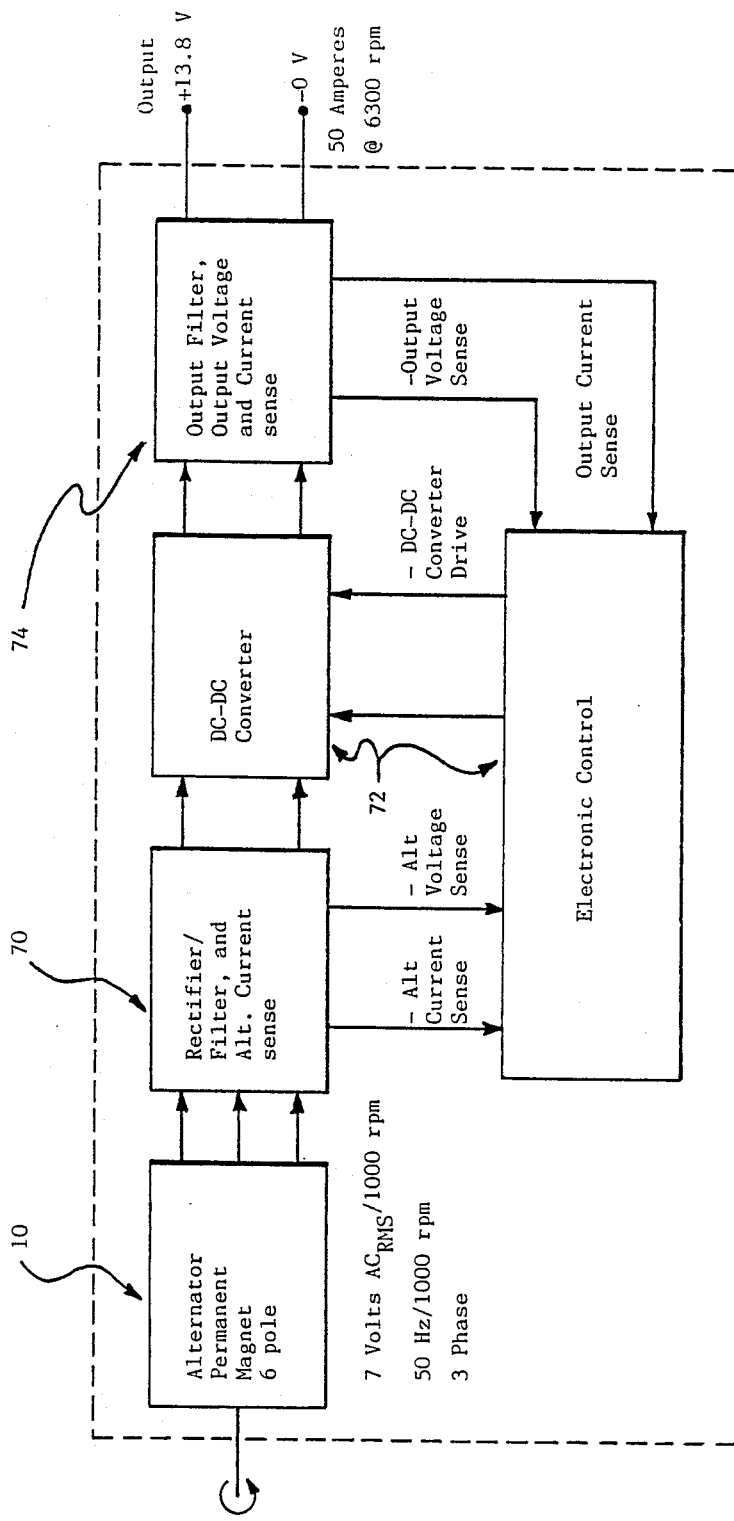
FIG. 8 is a block diagram of the alternator and electronic controls associated therewith.

The scheme of the regulator is shown in FIG. 8. Essential aspects thereof consist of a rectifier circuit 70, an electronic control circuit 72 principally for limiting the output current through the input of DC-DC converter 74 while allowing the input voltage at the input to rise, and to limit the output voltage of the DC-DC converter to, say, 13.8 volts in the case of a conventional 12 volt automotive assembly. Of course it is also in practice necessary to provide such things as filter circuits, overheat cutouts and the like and a complete system is shown in more detail in the circuit diagrams in FIGS. 9 to 11. The operation of this system should be clear to the skilled addressee and only some aspects thereof are described here in detail.

By the use of an electronic DC-DC converter to regulate output voltage, this invention enables the use of a simple permanent magnet alternator to operate over a wide RPM range. The DC-DC converter also controls the alternator output current in order to provide a 5.5 times magnification effect of the output current at the rated maximum RPM (6300 rpm).

Figure 9:
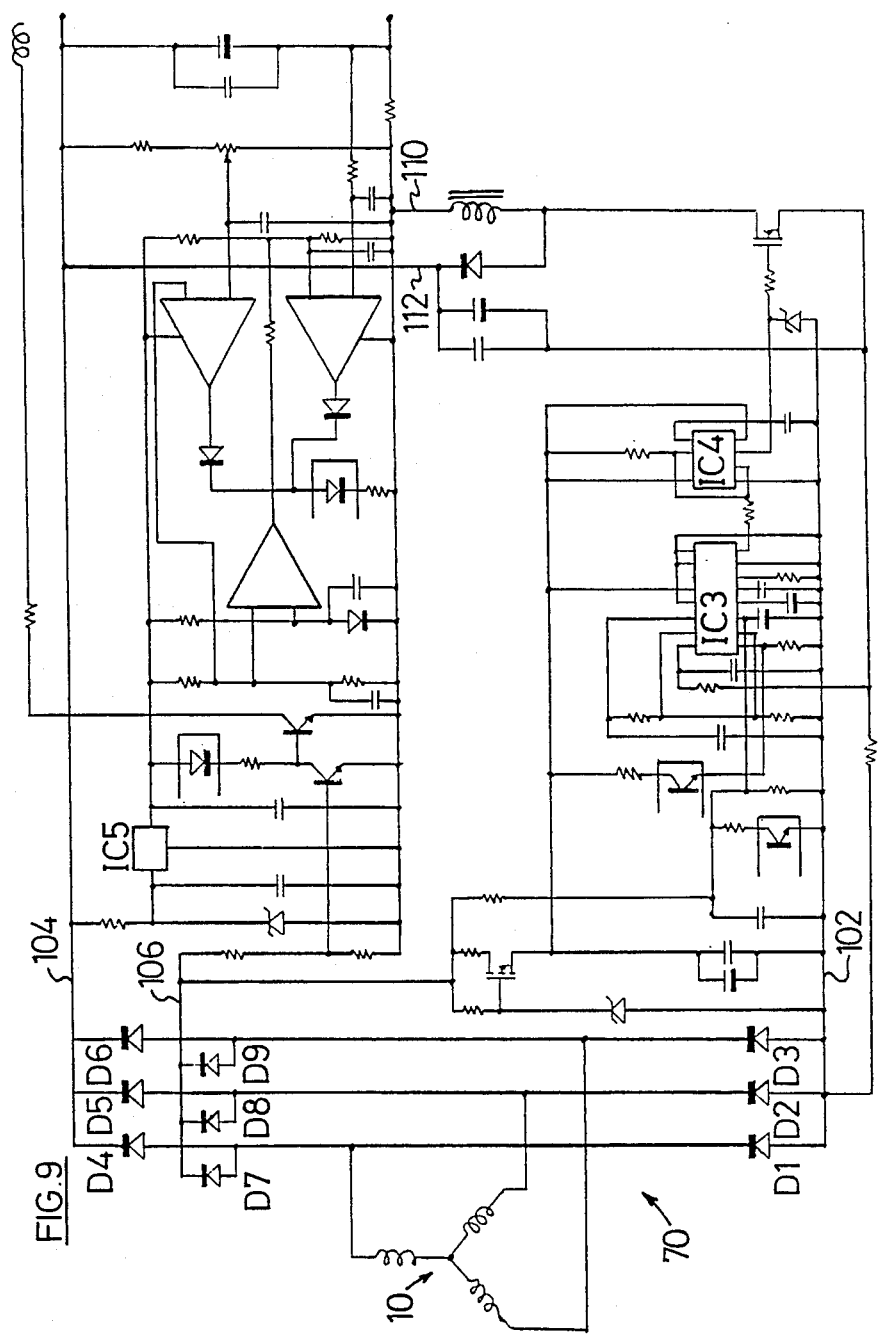
FIG. 9 is a circuit diagram showing schematically the alternator and the electronic controls.
Figure 10:
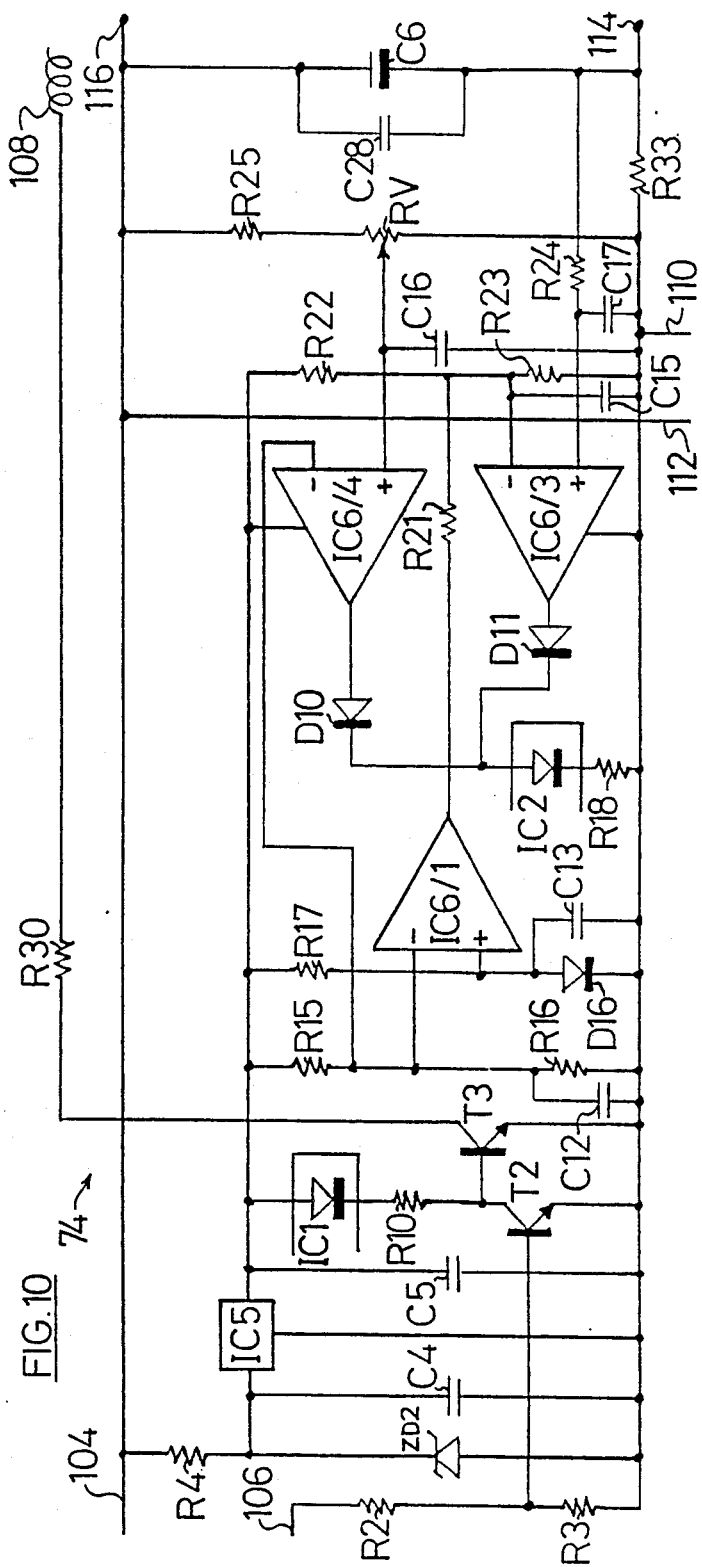
FIG. 10 shows part of the circuit of FIG. 9 in greater detail.
Figure 11:
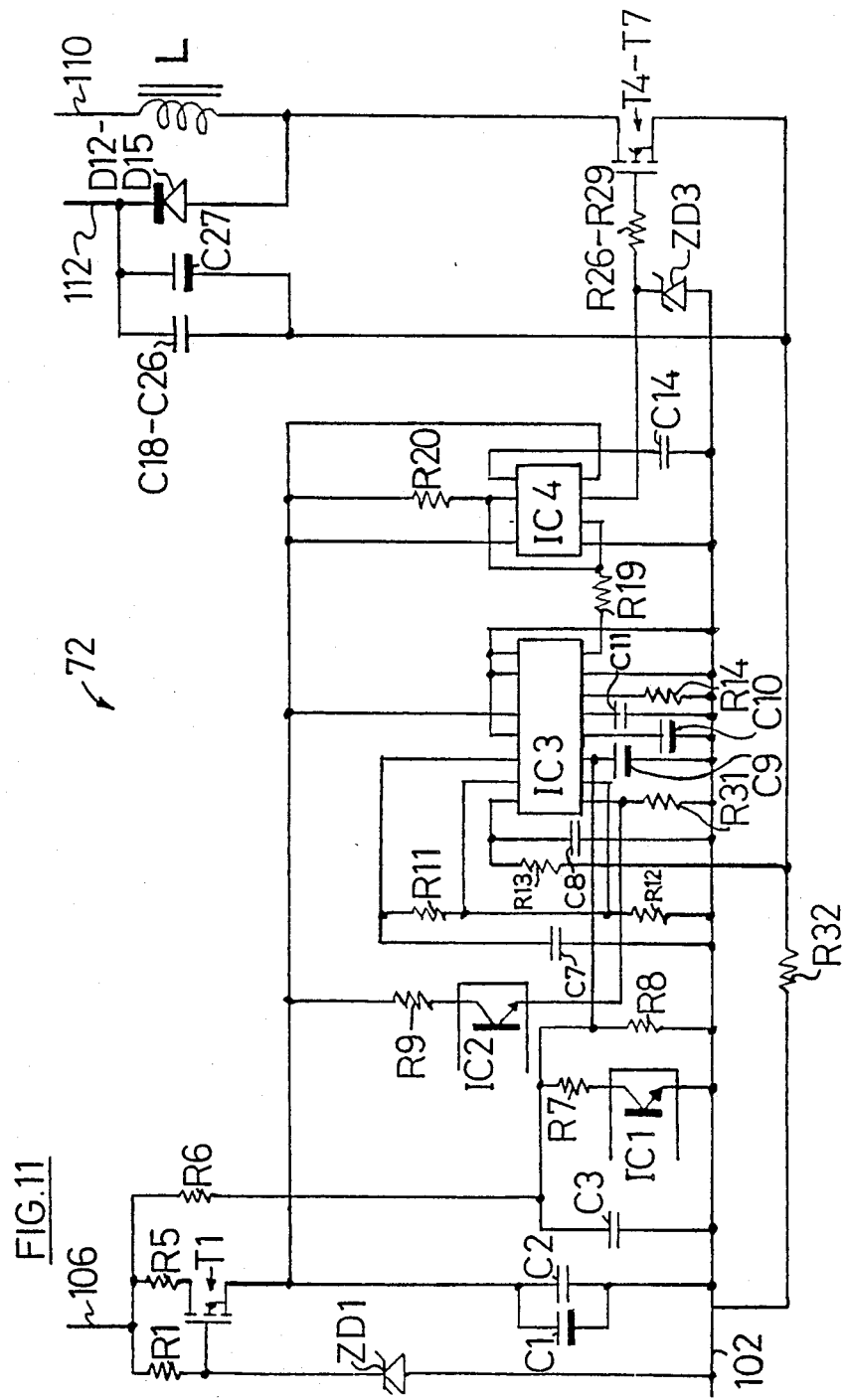
FIG. 11 shows another part of the circuit of FIG. 9, also in greater detail.

Referring to the circuit diagrams in FIGS. 9 to 11 and block diagram FIG. 8, spinning the rotor of the permanent magnet alternator 10 produces an alternating voltage in the stator windings which is then fullwave rectified by diodes D1 to D6 to produce a DC voltage across lines 102, 104 proportional to rotor rpm. Diodes D7 to D9 produce a separate isolated DC supply across lines 102, 106 for the negative referenced electronic circuit 72.

The isolated DC supply is also used to indicate onset of charging through the potential divide resistors R2 and R3. When the voltage across R3 is greater than 0.6 volts transistor T2 turns on, turning transistor T3 off, which then turns the ignition light 108 off. Resistors R1, R5, transistor T1 and zener diode ZD1 form a voltage regulator to provide a power supply for the negative referenced electronics.

By varying the pulse width of the DC-DC converter, the following control functions can be achieved:
  (i) Maximum current output of the permanent magnet alternator, is limited to 9.5 amperes.
  (ii) Output voltage regulation of the DC-DC converter to a maximum of 13.8 VDC is achieved by the error voltage produced at the wiper point of resistor RV.
  (iii) Output current limitation of the DC-DC converter to a maximum of 60 amperes DC is achieved by the error voltage produced across resistor R33.
  (iv) Output current limitation to below the maximum of 60 amperes DC if overheating occurs is achieved by monitoring the voltage of diode D16 which is thermally attached to the alternator housing.

The electronic control circuit uses an 'industry standard' integrated circuit Texas Instruments TL494 pulse width modulator circuit. The repetition rate or frequency of the DC-DC converter is fixed at 25 khz, the pulse width is controlled between 0% and 90%.

Resistors R6, R7 and R8, IC1 and capacitors C3 and C9 form a voltage divider network to limit the maximum pulse width that IC3 can produce when alternator voltage varies with varying engine rpm. This is necessary to allow correct operation of the series choke element L, over the very wide output voltage range of the alternator i.e. 12-200 volts DC. Optoisolator IC1 provides output current limiting in case of a short circuit on the output terminals of the DC-DC converter, i.e. +13.8 volts and 0 volts terminals. This is achieved by limiting the maximum output pulse width of IC3 to ten percent and the maximum output current at the output terminals under short circuit to thirty amperes.

The maximum pulse width is reduced to 0% when the alternator output voltage reaches 200 VDC. This corresponds to the alternator running at 13000 rpm. By reducing the maximum pulse width as the alternator output voltage increases, better stability and output control is achieved.

Electrical isolation between the electronic control and the DC-DC converter is achieved by use of optoisolators IC1 and IC2. This allows the electronic regulation control to be at 0 volts reference and the switching transistors T4-T7 of the DC-DC converter to 'float' at the rectified output voltage of the permanent magnet alternator.

Optoisolator IC2 and resistors R9 and R31 also control the maximum output pulse width of IC3 in order to regulate output current at the output terminals 114, 116 to sixty amperes under normal working conditions. The optoisolator IC2 output transistor (pins 4 and 5) is indirectly controlled by two operational amplifiers in IC6 and will be covered later.

Resistors R11 and R12 provide a reference voltage for the two comparator amplifiers of IC3. Resistor R32 provides an error voltage proportional to the output current of the alternator. This is set to provide current limiting at an average current of 9.5 amperes, and is achieved by reducing or limiting the output pulse width of IC3. Resistor R13 and capacitor C8 form a suitable time constant to average the error voltage appearing across resistor R32.

Resistor R14 and capacitor C11 set the output pulse frequency of IC3 which in this case is between 20–25 khz.

Integrated circuit IC4 is used purely as an output driver providing sufficient output current to turn switching transistors T4–T7 on and off quickly to provide minimal switching losses. Resistors R26–R29 reduce 'ringing' effects due to parasitic capacitance within the transistors. Zener diode ZD3 is a protection device to limit the voltage present at the inputs of the switching transistors.

The switching transistors T4–T7 of the DC-DC converter are power MOSFET devices rated at 200 VDC and 12.5 amps each. The power MOSFET devices require very little drive current and incur very low switching losses due to their very low switching times. The series pass inductor L is designed to work over a wide range of input voltage and current so as to allow precise control of the output voltage with varying output current.

Capacitors C18–C26 and C27 form the high voltage energy storage element for the DC-DC converter and must be capable of providing the majority of the current pulses that are switched into the choke element L in line 110.

Diodes D12–D15 in line 112 are fast recovery diodes that conduct the "free-wheeling" current which flows after transistors T4–T7 switch off.

Referring now to the output control circuit 74 which are ground referenced to the zero volts output terminal 114, the power supply for the electronics is derived from the +13.8 volt output terminal 116. Resistor R4, zener diode ZD2 and capacitors C4 and C5 provide a regulated 6 volt supply for the circuit 74.

Resistors R15 and R16 provide a reference voltage for IC6/1 and IC6/4. Diode D16 is used to sense the case temperature of the alternator and voltage across it falls with increasing temperature. If the temperature of the alternators case exceeds 80° C. then the output of IC6/1 (pin 1) goes low reducing the reference voltage produced by R21 and R22 in series with R23 from 25 mV to 6 mV thus reducing the maximum allowable output current at the output terminals from 60 to 15 amperes. This then reduces the amount of waste heat generated in the alternator windings, switching transistors, power diodes and inductor, allowing the alternator and DC-DC converter to cool down below 80° C. and then the maximum output of sixty amperes is restored. An error voltage is produced by the output current flowing through resistor R33. This is then averaged by the combination of resistor R24 and capacitor C17. At an output current of sixty amperes the output of IC6/3 (pin 8) goes high providing current flow through optoisolator diode IC2. This causes the photo-transistor in IC2 to conduct which raises the voltage of pin 1 of IC3 above the reference voltage on pin 2. This then reduces the output pulse-width of IC3 and consequently transistors T4–T7. This then reduces the current at the output terminals and current limiting over-rides voltage regulation and the output voltage will drop if additional loading occurs.

Resistor R25 and variable resistor RV are a voltage dividing network to provide an error voltage to the input of IC6/4 (pin 12). If the error voltage is higher than the reference voltage pin 13 then the output of IC6/4 (pin 14) goes high providing current flow through optoisolator diode IC2. This then provides an identical situation to the current limiting just described and has the overall effect of controlling the output voltage within close limits, provided the alternator can produce sufficient output power to then maintain the final output voltage of the DC-DC converter with the load and consequent current it draws.

Resistor RV is adjustable to allow the output voltage to be accurately set to 13.8 volts DC (or any similar voltage if so desired).

Capacitors C28 and C6 form an output energy storage filter to allow the DC-DC converter time to respond to sudden changes in loading and not incur too large a change in output voltage before full regulation control is regained.

The system therefore provides a self-exciting alternator which requires no initial field excitation current from an associated battery.

Sufficient output current is produced at low rpm to power the automotive ignition system when an automobile is being 'push' started with a completely flat battery. This cannot be achieved with conventional automotive alternators.

The output current, i.e. 50 amperes, is double that of conventional automotive alternators at the same rate r.p.m. The overall electrical efficiency of this alternator at maximum output current is about 80%; i.e, about double that of conventional alternators, therefore enabling an output current of 50 amperes to be produced with a single fan-belt and pulley.

By the utilisation of the voltage and current transforming effect of the DC-DC converter, a much higher maximum output current at a fixed voltage is able to be achieved from the permanent magnet alternator. This results from the careful matching of output characteristics to the DC-DC converter to provide higher output current from the overall device.

For example, at maximum rated output, 6300 rpm, the permanent magnet alternator is producing 712 Watts, i.e. 75 VDC @9.5 amperes which is converted by the DC-DC converter to 50 amperes at 12.5 VDC or 625 watts with a conversion efficiency of 88%.

By the use of a DC-DC converter a constant voltage output can be obtained from a permanent magnet alternator with varying loads and r.p.m. of the alternator, provided the alternator is producing sufficient electrical power.

The rotor of the alternator is a one part item which includes drive pulley and bearing housings. The rotor runs outside the stator in order to provide satisfactory support for the ceramic magnets against immense certrifugal forces (around 10,000 times gravity force at 15,000 rpm).

It is envisaged that regulators of the type described may be used with conventional automotive alternators, i.e. with field wound rotors and also as accessories or original equipment on motor cycles with permanent magnet type alternators. They may in fact be used with any suitable DC or rectified AC power supply.

The following is a list of exemplary components for the circuit shown in FIG. 9.

| ELECTRONIC COMPONENT PARTS LIST | | | | |
|---|---|---|---|---|
| 1. Semiconductors | | | | |
| D1–D6 | Diode | BY229-400 | 400 v | 7 A |
| D7–D9 | " | BYV95B | 400 v | 1.5 A |
| D10–D11 | " | IN4148 | 75 v | 0.2 A |
| D12–D15 | " | BYV44/500 | 500 v | 30 A |
| D16 | " | IN4001 | 50 v | 1 A |
| ZD1–ZD3 | Zener Diode | | 15 v | 1 W |
| T1 | Transistor | BUZ30 | 200 v | 7 A |
| T2,T3 | " | BC639 | 100 v | 1 A |
| T4–T7 | " | BUZ31 | 200 v | 12.5 A |
| IC1,IC2 | Optoisolator | 4N25 | | |
| IC3 | PWM | TL494 | | |
| IC4 | Driver | NE555 | | |
| IC5 | Regulator | 78LO6 | | |
| IC6 | Op-amp | LM324 | | |
| 2. Resistors | | | | |
| R1 | 100 kohm | | | |
| R2 | 10 kohm | | | |
| R3 | 10 kohm | | | |
| R4 | 390 ohm | | | |
| R5 | 15 ohm | | | |
| R6 | 2.2 Mohm | | | |
| R7 | 22 kohm | | | |
| R8 | 220 kohm | | | |
| R9 | 82 kohm | | | |
| R10 | 2.7 kohm | | | |
| R11 | 47 kohm | | | |
| R12 | 470 ohm | | | |
| R13 | 10 kohm | | | |
| R14 | 3.3 kohm | | | |
| R15 | 100 kohm | | | |
| R16 | 5.6 kohm | | | |
| R17 | 82 kohm | to suit diode | | |
| R18 | 1 kohm | | | |
| R19 | 3.3 kohm | | | |
| R20 | 10 kohm | | | |
| R21 | 47 kohm | | | |
| R22 | 330 kohm | | | |
| R23 | 330 ohm | | | |
| R24 | 10 kohm | | | |
| R25 | 180 kohm | | | |
| R26–R29 | 150 ohm | | | |
| R30 | 33 ohm | 1 W | | |
| R31 | 470 ohm | | | |
| R32 | 240 mm | 1 mm² copper | | |
| R33 | 100 mm | 4 mm² copper | | |
| RV | 5 kohm | 10 turn | | |
| 3. Capacitors | | | | |
| C1 | 220 micro-farad | 16 v | | |
| C2 | 0.1 micro-farad | 50 v | | |
| C3 | 0.1 micro-farad | " | | |
| C4 | 0.1 micro-farad | " | | |
| C5 | 0.1 micro-farad | " | | |
| C6 | 4700 micro-farad | 16 v | | |
| C7 | 0.1 micro-farad | 50 v | | |
| C8 | 0.1 micro-farad | " | | |
| C9 | 220 micro-farad | 16 v | | |
| C10 | 10 micro-farad | 16 v | | |
| C11 | 0.01 micro-farad | 50 v | | |
| C12 | 0.1 micro-farad | " | | |
| C13 | 0.1 micro-farad | " | | |
| C14 | 0.1 micro-farad | " | | |
| C15 | 0.1 micro-farad | 50 v | | |
| C16 | 0.01 micro-farad | " | | |
| C17 | 0.1 micro-farad | " | | |
| C18–C26 | 2.2 micro-farad | 250 v | | |
| C27 | 220 micro-farad | " | | |
| C28 | 1 micro-farad | 50 v | | |
| 4. Inductor | | | | |
| L | ETD49, 4 mm total airgap 15 turns of 12 × 1 mm diameter copper (single layer construction to reduce winding capacitance) | | | |

The claims defining the invention are as follows:
I claim:

1. A regulator for regulating the output of an uncontrolled variable DC power supply driven by a variable speed source of mechanical power, comprising
   (a) current limiting means including an input for connection to the output of the supply and an output, said current limiting means being capable of limiting the current from the supply to protect the supply while allowing the voltage from the supply to vary;
   (b) voltage converting means having an input for connection to the output of the current limiting means and an output for connection to a load, said voltage converting means being capable of converting said variable voltage from the output of the current limiting means to a controlled DC voltage; and
   (c) control means having first sensing means for sensing current from the supply, second sensing means for sensing output current to the load, and third sensing means for sensing the output voltage of the voltage converting means, whereby in use the regulator converts the output from an uncontrolled variable DC power supply driven by a variable speed source of mechanical power into a controlled output of substantially constant voltage.

2. A regulator as defined in claim 1, wherein said current limiting means comprises pulse-width modulator means.

3. A regulator as defined in claim 1, wherein the maximum pulse width of said pulse width modulator means is reduced as the voltage of the supply increases to a predetermined level.

4. A regulator as defined in claim 3, wherein the maximum pulse width is reduced to 0% when the voltage of the supply reaches about 200 volts.

* * * * *